(12) United States Patent
Sutherland et al.

(10) Patent No.: US 8,837,867 B2
(45) Date of Patent: Sep. 16, 2014

(54) METHOD AND SYSTEM TO DETECT AND SELECT BEST PHOTOGRAPHS

(71) Applicant: RealNetworks, Inc., Seattle, WA (US)

(72) Inventors: Alastair Sutherland, Seattle, WA (US); Kadir Rathnavelu, Bellevue, WA (US); Ed Smith, Lynnwood, WA (US)

( * ) Notice: Subject to any disclaimer, the term of this patent is extended or adjusted under 35 U.S.C. 154(b) by 91 days.

(21) Appl. No.: 13/708,836

(22) Filed: Dec. 7, 2012

(65) Prior Publication Data

US 2014/0161348 A1 Jun. 12, 2014

(51) Int. Cl.
*G06K 9/54* (2006.01)
*G06K 9/60* (2006.01)
*G06K 9/62* (2006.01)

(52) U.S. Cl.
CPC .................................. *G06K 9/6201* (2013.01)
USPC .......................................... 382/305; 382/170

(58) Field of Classification Search
USPC .......... 382/118, 162, 165, 168, 170, 219, 305
See application file for complete search history.

(56) References Cited

U.S. PATENT DOCUMENTS

| | | | |
|---|---|---|---|
| 2007/0098303 A1* | 5/2007 | Gallagher et al. | 382/305 |
| 2010/0250539 A1 | 9/2010 | Zhou et al. | |
| 2010/0271395 A1 | 10/2010 | Isogai et al. | |
| 2011/0200251 A1* | 8/2011 | Chin et al. | 382/168 |
| 2012/0155752 A1* | 6/2012 | Zhang et al. | 382/162 |
| 2013/0050460 A1* | 2/2013 | Steinberg et al. | 348/77 |

FOREIGN PATENT DOCUMENTS

| | | |
|---|---|---|
| KR | 1020070009338 A | 1/2007 |
| KR | 10-1108761 B1 | 2/2012 |
| KR | 10-1145278 B1 | 5/2012 |

OTHER PUBLICATIONS

Tong, H. (2004) "Blur Detection for Digital Images Using Wavelet Transform". Presented at Multimedia and Expo, 2004. ICME '04. 2004 IEEE International Conference on Jun. 27-30, 2004 (pp. 17-20 vol. 1). Beijing, China.

* cited by examiner

*Primary Examiner* — Phuoc Tran
(74) *Attorney, Agent, or Firm* — Adam Philipp; Æon Law

(57) ABSTRACT

Disclosed is a software routine which determines which photographs in a corpus are similar, groups the similar photographs, and which then determines which photographs within a group meet criteria of "better" photographs.

21 Claims, 13 Drawing Sheets

METHOD AND SYSTEM TO DETECT AND SELECT BEST PHOTOGRAPHS

BACKGROUND INFORMATION

Digital photography makes it possible for people to take hundreds, even thousands, of digital photographs, without the time and expense of developing negatives and prints from film. As a result, people now commonly take multiple photographs of the same subject, some of which photographs are better than others for various reasons, such as over- or under-exposure, the photo being out of focus, or a human subject having closed eyes. Users must manually review the digital photographs, delete the less desirable ones, drag the better photographs into folders, or otherwise tag the photographs to segregate the "good" from the "bad." In the context of hundreds or thousands of photographs, this is a significant chore, one which often goes unfinished when left to manual processes.

However, performing these processes programmatically, by software in a computer, is not straight forward.

Needed is a system which can programmatically identify which photographs are of the same or a similar subject and which can then select photographs of the similar subject which meet criteria which correspond to "better" photographs.

SUMMARY

Disclosed is a software routine which determines which photographs in a corpus are similar, groups the similar photographs, and which then determines which photographs within a group meet criteria of "better" photographs.

DETAILED DESCRIPTION

The following description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list.

Certain elements appear in various of the Figures with the same capitalized element text, but a different element number. When referred to herein with the capitalized element text but with no element number, these references should be understood to be largely equivalent and to refer to any of the elements with the same capitalized element text, though potentially with differences based on the computing device within which the various embodiments of the element appears.

Figure 1:
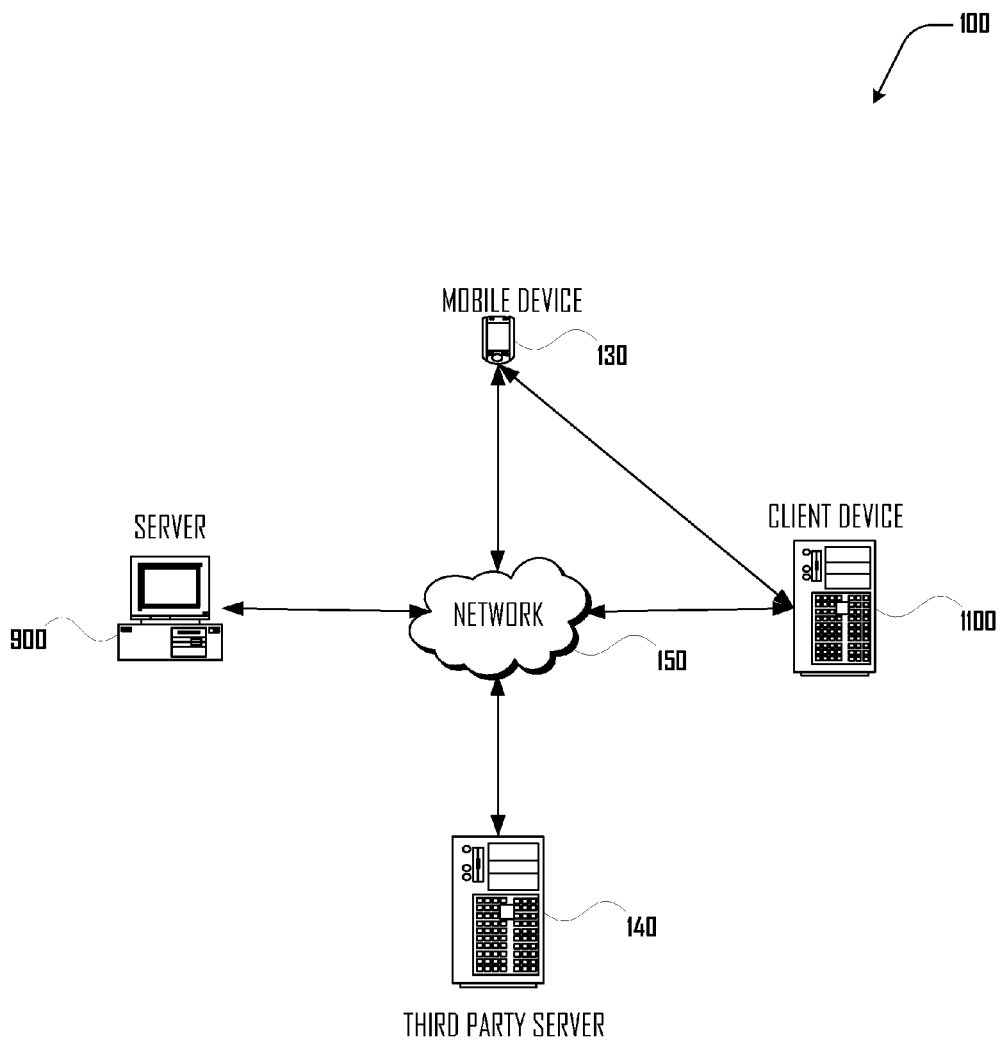
FIG. 1 is a network and device diagram illustrating exemplary computing devices configured according to embodiments disclosed in this paper.

FIG. 1 is a network and device diagram illustrating exemplary computing devices configured according to embodiments disclosed in this paper. In FIG. 1, a Client Device 1100 computer is connected to a Network 150, such as the Internet. The Network 150 comprises computers, network connections among the computers, and software routines to enable communication between the computers over the network connections.

Also illustrated in FIG. 1, a Mobile Client Device 1300 computer is connected to the Network 150 and to the Client Device 1100. The Client Device 1100 and the Mobile Client Device 1300 are both referred to herein as a "Client Device" without an element number and should be understood herein to represent potentially equivalent computing devices; the two are illustrated as separate devices in FIG. 1 for the purpose of illustrating that a user may utilize a Mobile Client Device 1300 to take photographs, such as Photographs 1205, and that the user may transmit Photographs 1205 to the Client Device 1100 through the direct connection between the Client Device 1100 and the Mobile Client Device 1300 and/or through the Network 150. The Mobile Client Device 1300 (and the Client Device 1100) may also transmit the Photographs 1205 to the GS Server 900 and/or the Third Party Server 140 (discussed further below).

Figure 9:
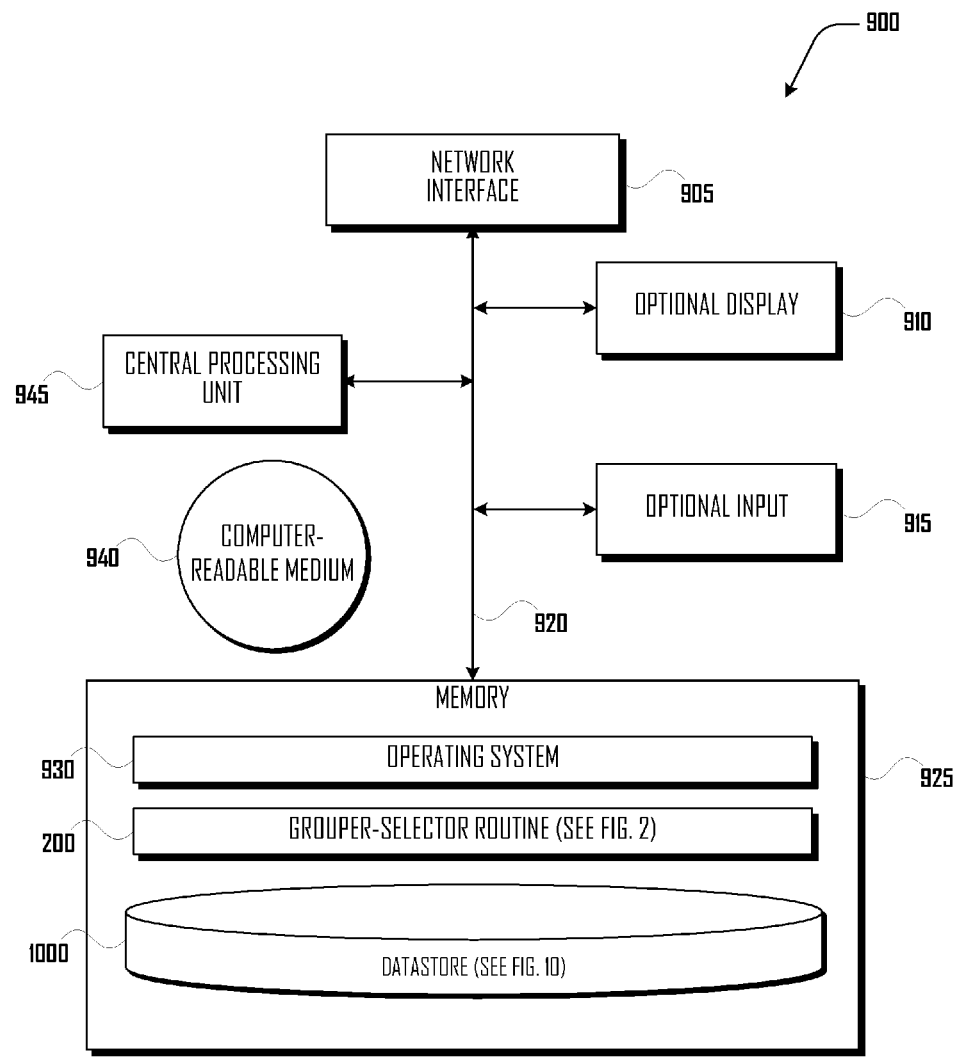
FIG. 9 is a functional block diagram of an exemplary server computing device ("GS Server") and some data structures and/or components thereof.
Figure 10:
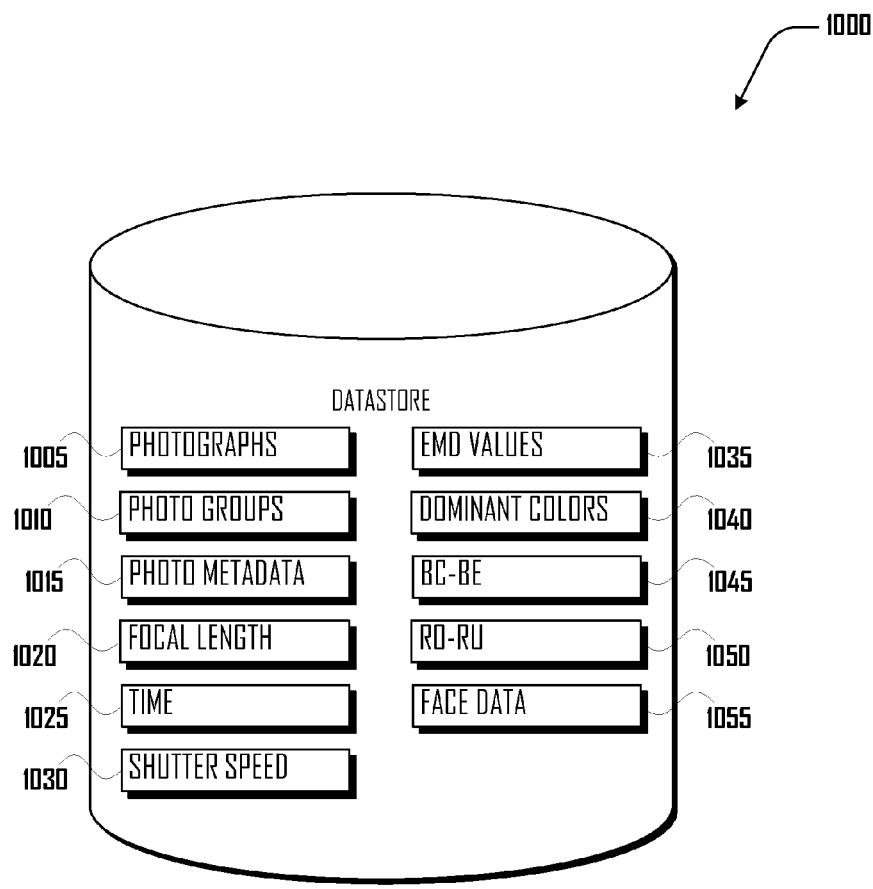
FIG. 10 is a functional block diagram of a datastore in the computing device of FIG. 9.
Figure 11:
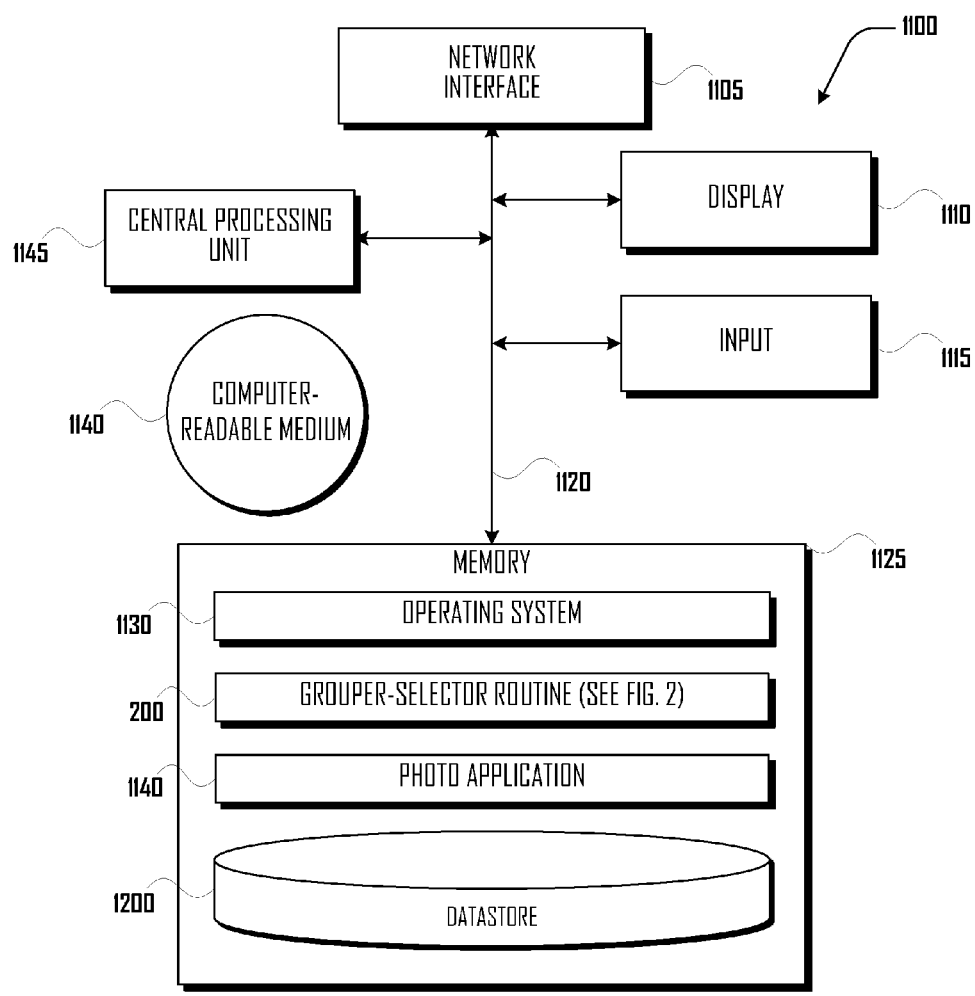
FIG. 11 is a functional block diagram of an exemplary client computing device ("Client Device") and some data structures and/or components thereof.

FIG. 1 illustrates a GS Server 900 as being connected to the Network 150. FIGS. 9 and 10 illustrate the GS Server 900 as comprising a Datastore 1000; similarly, FIG. 11 illustrates the Client Device as comprising a Datastore 1200. This paper discusses components as connecting to the GS Server 900 or to the Client Device, on the one hand, or to the Datastore 1000 or Datastore 1200, on the other hand; it should be understood that such connections may be to, through, or via the other of the two components (for example, a statement that a computing device connects with or sends data to the GS Server 900 should be understood as saying that the computing device may connect with or send data to the GS Server 900 and/or the Datastore 1000). References herein to "database" should be understood as equivalent to "Datastore." Although illustrated in FIGS. 9 and 11 as components integrated in one physical unit, the servers and databases may be provided by common (or separate) physical hardware and common (or separate) logic processors and memory components. The GS Server 900 and Datastore 1000 may also be components of or within a Client Device, rather than, as illustrated, separate devices.

The GS Server 900 and the Client Devices should also be understood herein to be equivalent computing devices. The GS Server 900 is illustrated as a separate device from the Client Devices for the purpose of illustrating that the system and method discussed herein may be performed in a client-server architecture, in which a Client Device or Third Party Server 140 transmits Photographs to the GS Server 900, which GS Server 900 prepares groups and selects Photographs as Photo Groups 1010, which Photo Groups are then transmitted to and/or rendered by a Client Device or Third Party Server 140 (as, for example, Photo Groups 1210).

Also illustrated in FIG. 1 is a Third Party Server 140 connected to the Network 150. The Third Party Server 140 represents, for example, online services, such as a service which stores and organizes photographs, such as Google, Inc.'s PICASA® service or Facebook, Inc.'s FACEBOOK® service, and services which perform, for example, facial analysis and return the result of such facial analysis, for example, to the GS Server 900 as Face Data 1055. Such services shall be referred to herein as "Online Services." The Photographs 1005 may be transmitted to the GS Server 900 by a Client Device and/or by the Third Party Server 140. Transmitting the Photographs 1005 to the GS Server 900 may involve a process in which the Third Party Server 140 or a Client Device notifies the GS Server 900 that Photographs are available, following which the GS Server contacts the Third Party Server 140, presents credentials to authenticate and authorize the GS Server 900, and then downloads the Photographs 1005. Transmission of Photographs to the GS Server 900 by a Client Device is discussed further below. The Photographs, Photo Groups, and Photo Metadata are discussed as being transmitted between the GS Server 900 and the Client Devices; it should be understood that the Third Party Server 140 may have a role equivalent to that of the Client Devices and that the GS Server 900 may communicate with the Third Party Server 140 instead of or in addition to communicating with the Client Devices.

The computers in FIG. 1 are illustrated in FIGS. 9 and 11 (and 10 and 12) as comprising data groups for routines and applications, such as Photo Application 1140 and Grouper-Selector 200. Additional data groups for routines, such as for a webserver and web browser, may also be present on and executed by these devices. The computers in FIG. 1 are illustrated in FIGS. 9 and 11 (and 10 and 12) as comprising data groups used by routines, such as (without providing an exhaustive list of all the elements) Photographs (1005 and 1205), Photo Groups (1010 and 1210), and Photo Metadata (1015 and 1300). The data groups used by routines may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar. The browsers routines may provide an interface for interacting with the GS Server 900, for example, through a webserver routine (which may serve data and information in the form of webpages). The browsers and webservers are meant to illustrate user-interface and user-interface enabling routines generally, and may be replaced by equivalent routines for serving and rendering information to and in a user interface in a Client Device. Login credentials and local instances of user profiles may be stored in or be accessible to the Client Devices, the GS Server 900, and the Third Party Server 140.

In an implementation, one or another of the computers may not have some of the data groups; for example, if the Mobile Client Device 1300 is a relatively limited purpose digital camera (instead of being a more general purpose computing device), it may not have data groups for, for example, Photo Groups and/or the Photo Application in the Mobile Client Device 1300 may not have all of the functions found in the Photo Application implemented in a (non-mobile) Client Device 1100.

Figure 2:
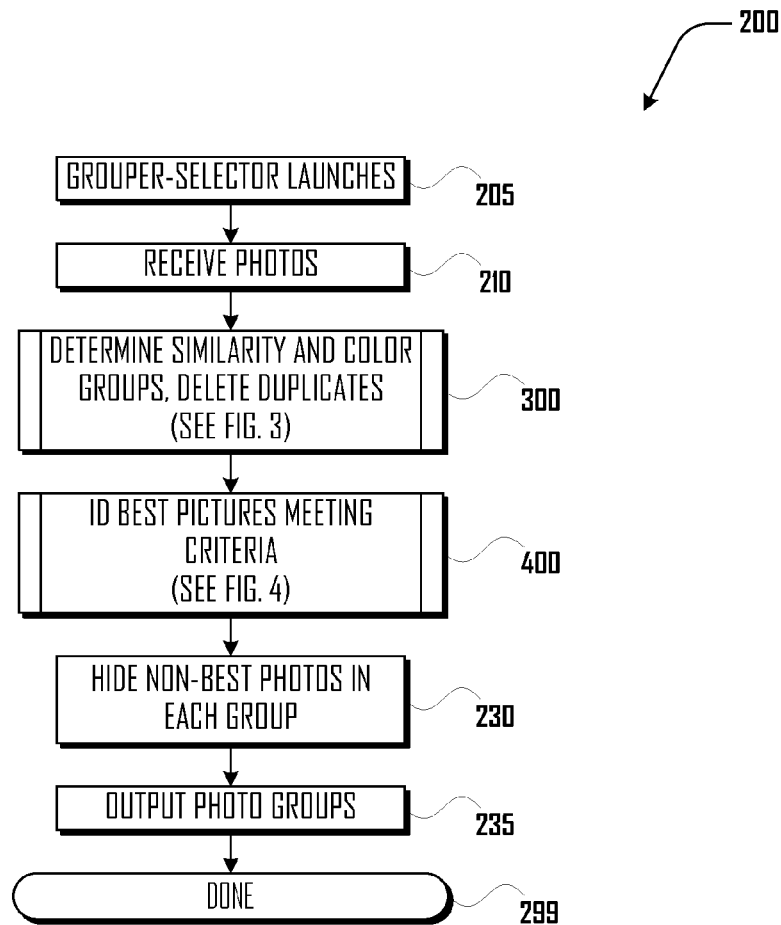
FIG. 2 is a flowchart illustrating an overview of a process to programmatically group Photographs according to similarity and to identify Photographs within each group which meet criteria designed to identify the best Photographs in each group.
Figure 3:
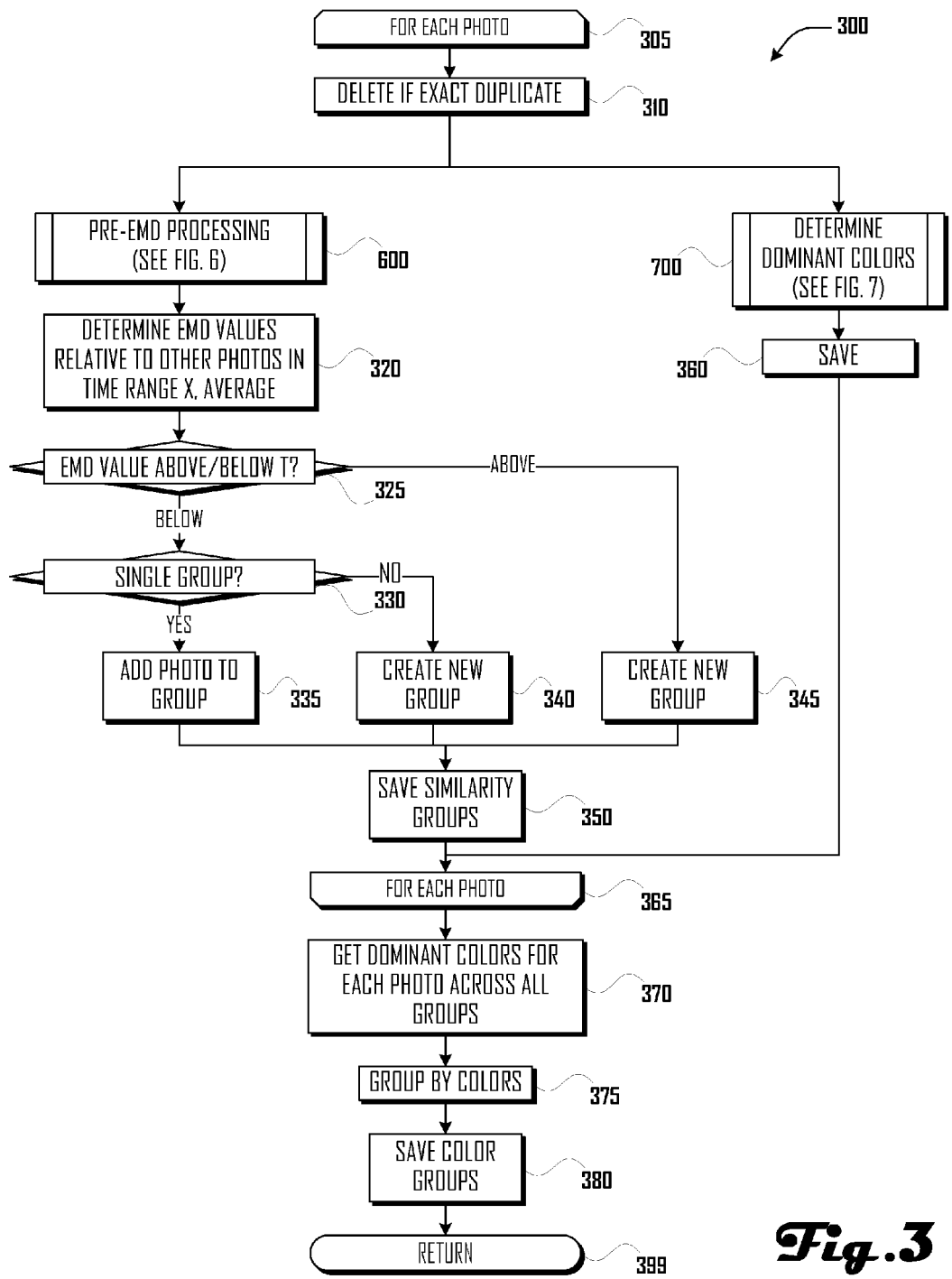
FIG. 3 is a flowchart illustrating a detail of a process illustrated in FIG. 2, in which similarity groups are determined.

The Grouper-Selector (200) is a software routine which groups Photographs according to similarity into Photo Groups and which selects Photographs within the Photo Groups which meet criteria designed to identify the best photographs within the Photo Groups; the Grouper-Selector is discussed further in relation to FIGS. 2 and 3 (and subsequent Figures illustrating details of these Figures).

The Photo Applications may be applications for importing, storing, and organizing photographs, such as Photographs. Examples of Photo Applications include IPHOTO® by Apple, Inc., and PICASA® by Google, Inc.

Photographs are digitally encoded photographs and may comprise, for example, database entries comprising photographs encoded in a digital format, such as a "raw" image file, a TIFF, JPEG, GIF, BMP, PNG, RGBE, IFF-RGFX, CGM, Gerber Format, SVG, and other digital image formats. Photographs may be associated in the Database with Photo Groups and may comprise or be associated with Metadata.

Figure 12:
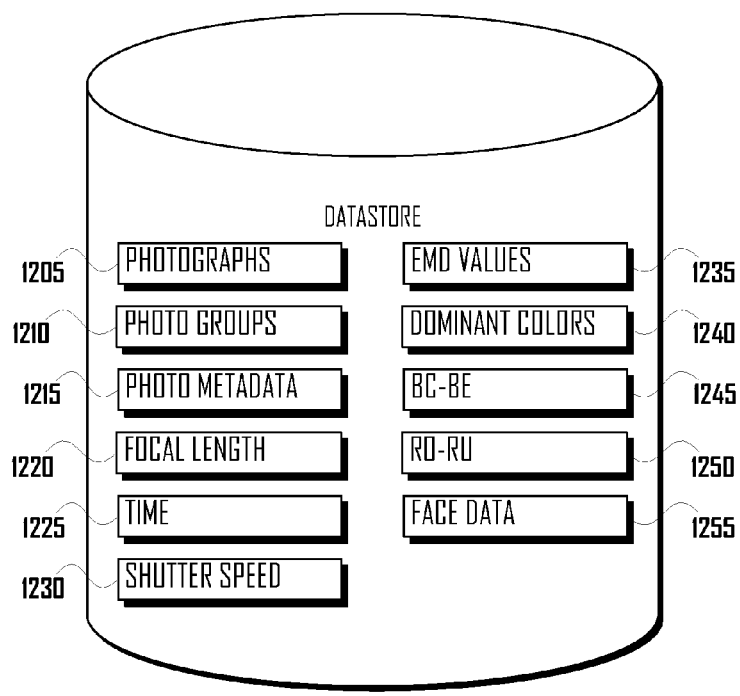
FIG. 12 is a functional block diagram of a datastore in the computing device of FIG. 11 and FIG. 13.

Metadata may comprise database entries comprising camera settings, time and date (together referred to herein as a "time-stamp," represented in FIGS. 10 and 12 as Time 1025 and 1400), shutter speed (Shutter Speed 0 and 1230), exposure (such as f-stop), image size (in pixels, distance units, or quantity of data), image orientation (such as portrait or landscape), magnification, focal length (Focal Length 1020 and 1220), compression, the camera name, the camera type, captions or other text associated with the photograph, and location (such as a latitude and longitude and other information used in geotagging procedures). Metadata may be formatted according to a standard, such as, for example, the International Press Telecommunications Council ("IPTC") Information Interchange Model, the IPTIC Core Schema for XMP, Extensible Metadata Plaform ("XMP"), Exchangeable image file format ("Exif"), Dublin Core Metadata initiative, or Picture Licensing Universal System. Certain Metadata entries are illustrated separately from Metadata in FIGS. 10 and 12 but may be part of or be found in the Metadata, such as, for example, Time and Shutter Speed.

The Photo Groups illustrated in FIGS. 10 and 12 are database entries representing groups of Photographs designated by the Grouper-Selector. The Photo Group database entries may record which Photographs are in the Photo Group, the order of Photographs within the Photo Group, a name which may have been given to the Photo Group (which may be one or more dominant colors found in Photographs in the Photo Group, a time-stamp or time-stamp range associated with the Photographs in the Photo Group, or similar), and whether Photographs in the Photo Group meet the selection criteria, as determined by the Grouper-Selector. The Photo Groups may further be organized into, represented by, or rendered as "albums" or "folders," by, for example, the Photo Application.

The software routines and data groups used by the software routines may be stored and/or executed remotely relative to any of the computers through, for example, application virtualization.

The computers illustrated in FIG. 1 are further described in relation to FIGS. 9, 10, 11, and 12.

FIG. 2 is a flowchart illustrating an overview of a process to programmatically group Photographs according to similarity and to identify Photographs within each group which meet criteria designed to identify the best Photographs in each group.

At step 205, the Grouper-Selector routine launches or otherwise continues to execute. At step 210 the Grouper-Selector receives Photographs, such as Photograph 1005. At step 300, the Grouper-Selector groups the Photographs in groups, such as into Photo Groups, according to similarity and Dominant Colors. An example of a process for doing so is further illustrated in FIG. 3 and subsequent Figures referenced in FIG. 3.

At step 400, the Grouper-Selector identifies the best Photographs in the Photo Groups, according to selection criteria. An example of a process for doing so is further illustrated in FIG. 4 and subsequent Figures referenced in FIG. 4. At step 230, the Grouper-Selector hides the Photographs in each Photo Group which do not meet the selection criteria.

At step 235, the Photo Groups are output. Outputting the Photo Groups may comprise transmitting the Photo Groups to a Client Device and/or the Third Party Server, which recipient device may render the Photo Groups utilizing, for example, the Photo Application. The Photo Groups may be output by transmitting the Photographs to the recipient device in conjunction with data records, such as Photo Groups and/or Metadata, which data records identify the Photographs as belonging to Photo Groups and/or which data records identify which Photographs should be hidden (either within the Photo Groups or within folders or albums utilized by the Photo Application). If the recipient device already has the Photographs, the GS Server 900 may transmit to the recipient device only the data records discussed in the preceding sentence.

FIG. 3 is a flowchart illustrating a detail of a process illustrated in FIG. 2, in which similarity groups are determined. Steps 305 to 365 illustrate a process executed with respect to individual Photographs. At step 310, a determination may be made regarding whether a Photograph is an exact duplicate of a Photograph already in, for example, the Datastore 1000 (or 1200). Determination of whether a Photograph is an exact duplicate of a preceding Photograph may be based, for example, on whether a hash or signature or data group of or within the Photograph is the same as a hash or signature or data group of or within preceding Photographs. Deletion of exact duplicates may involve executing a dialog with a user to confirm the deletion.

At step 600, pre-Earth Mover's Distance ("EMD") or other pre-distance function processes may be executed relative to each individual Photograph. An example of this is illustrated further in FIG. 6. Generally, the EMD or other distance function (discussed further below) involves comparing two or more Photographs to determine the "distance" between the Photographs. The EMD or other distance function may be performed relative to an aspect of a first Photograph which may be computed in isolation from other Photographs to which the first is being compared. Step 600 performs this pre-EMD (or other pre-distance function) processes. The output of this pre-EMD process may be stored, so that it does not have to be recomputed in the future.

Figure 6:
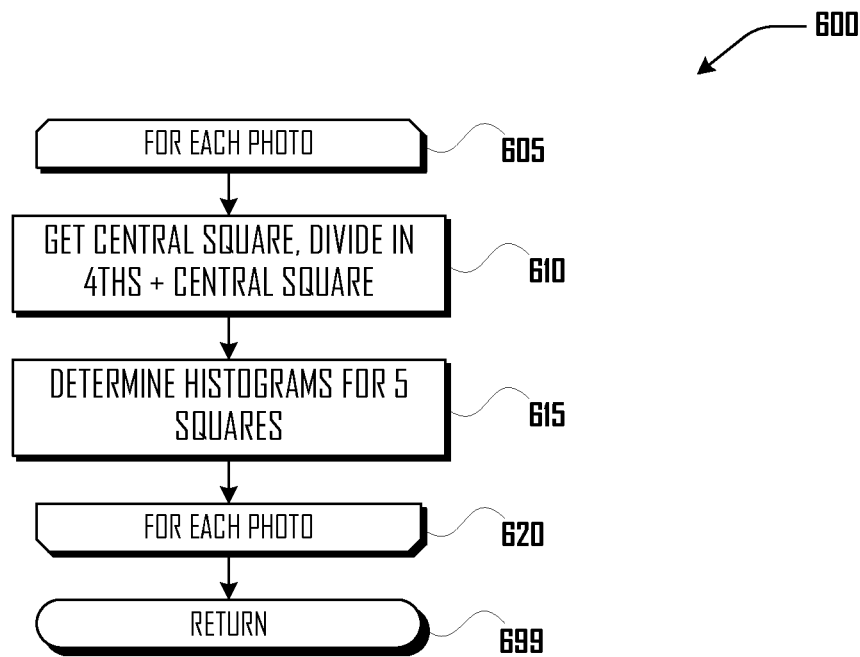
FIG. 6 is a flowchart illustrating a detail of a process illustrated in FIG. 3, in which photographs are processed before determining an "earth mover's distance" value.
Figure 8:
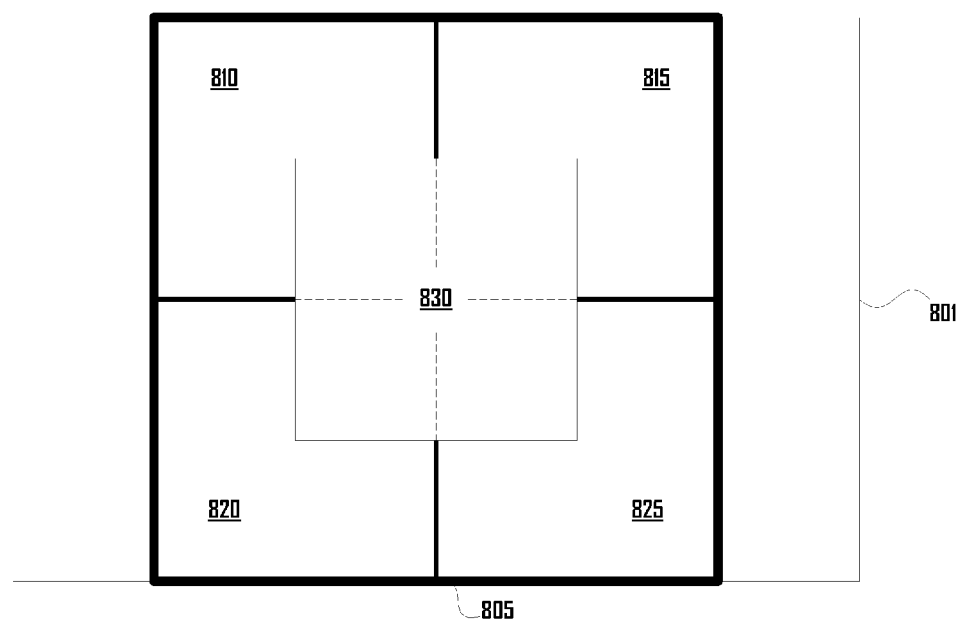
FIG. 8 illustrates a rectangular photograph with one large square, divided into four sub-squares, and with one additional sub-square centered in the large square.

Referring to FIG. 6 as an example of pre-EMD processes, at step 610 the Grouper-Selector obtains a portion of a Photograph, such as a square, which square may be a central square in a Photograph (the portion of the Photograph does not have to be a square and the square or other portion does not have to be located in the center of the Photograph). An example of such a portion is illustrated in FIG. 8, wherein rectangular Photograph 801 comprises a square 805. The portion may be subdivided into sub-portions. As illustrated in FIG. 8, square 805 is divided into fourth sub-squares, 810, 815, 820, and 825 (the sub-portions do not have to be squares and may comprise less than the entire portion which they divide). An additional sub-portion may be included, such as sub-square 830 (shown in FIG. 8 to be centered in square 805 and to be the same size as the other four sub-squares). At step 615 color histograms for the portions are determined. While FIG. 8 illustrates an example, it would be recognized that this number of portions nor portions of these dimensions are required. What is required, generally, is that a histogram of some or all of the Photograph be prepared, provided that the portion be consistent across the Photographs. Identification of a consistent portion may, as illustrated, be performed relative to absolute geometric coordinates in Photographs or it may be performed relative to a portion relative to an area of interest within a Photograph, such as an identified face (which may move from Photograph to Photograph).

At step 320, an EMD or other distance function is performed relative to each Photograph and other Photographs in time range X (which may, for example, be between 5 and 15 minutes). Time range X may be relative to each Photograph or the Photographs may be clustered by time-stamp, with the EMD or other distance function being performed across Photographs in each cluster. Instead of relative to time range X, the EMD or other distance function may be performed relative to another grouping of Photographs, such as Photographs in one folder or album in a Photo Application.

The EMD or other distance function is performed relative to the histogram(s) or other pre-EMD process output prepared at step 600. An EMD function is an example of a distance function which measures the "distance" between two probability distributions over a region. EMD functions are a type of Wasserstein metric. Phrased another way, the EMD or other distance function determines the minimum "cost" to transform a first item into a second item. Because the histogram(s) prepared in step 600 represent the Photograph as a graph of pixels and frequencies (other histograms may be used, such as a monochrome histogram, which represents pixels and intensity), it is possible to compare the histograms of the two Photographs and determine if there is a great or small distance between the two histograms. If there is a small distance, the Photographs are very likely to be of the same subject matter, even if there are some differences. The differences between two Photographs of the same subject may come, for example, from different resolutions, dithering, blurring, local deformations, or a shift in frame relative to the subject. In the example illustrated in FIGS. 6 (and 8), five color histograms of five different squares within each Photograph were prepared at step 600. The EMD or other distance function of step 320 may be performed relative to each of the five color histograms prepared from the two Photographs, with the output of the EMD function for each of the five color histograms (across the two Photographs) being, for example, averaged. The EMD or other distance function value of each Photograph relative to other Photographs in time range X may be saved, for example, as EMD Values (5 and 1235).

At step 325, a determination may be made regarding whether the EMD or other distance function value is above or below a threshold, "T." The threshold may be depend, for example, on the type of distance function used, on the type of histogram used, on the units used, on the tolerance for false positive rate (for finding similarity between Photographs), and similar. In the example shown herein, a threshold of 50 was found to be effective. Multiple thresholds may be used, for example, to group Photographs according to whether they are identical, nearly exact copies, and similar in theme (for example, snowy winter scenes, blue sky above with grass below, etc.).

If the determination at step 325 is that the EMD or other distance function value relative to other Photographs in time range X is that the EMD or other distance function value between the Photograph and other Photographs is below the threshold T (meaning the Photographs are similar), then a determination may be made at step 330 regarding whether the other similar Photographs are part of a single similarity group or part of more than one similarity group. At step 335, the determination at step 330 was affirmative and the Photograph is added to the identified group, such as Photo Group 1010. At step 340, the determination at step 330 was negative and a new group, such as a new Photo Group 1010, is created for the Photograph. If, at step 325, the determination was that the EMD or other distance function value between the Photograph and other Photographs is above the threshold T (meaning the Photographs are not similar), then at step 345 a new group, such as a new Photo Group 1010, is created for the Photograph. At step 350, the similarity groups are saved, such as in Photo Groups 1010. After the similarity groups are saved, the EMD Values 113 may be discarded or retained for future use.

Figure 7:
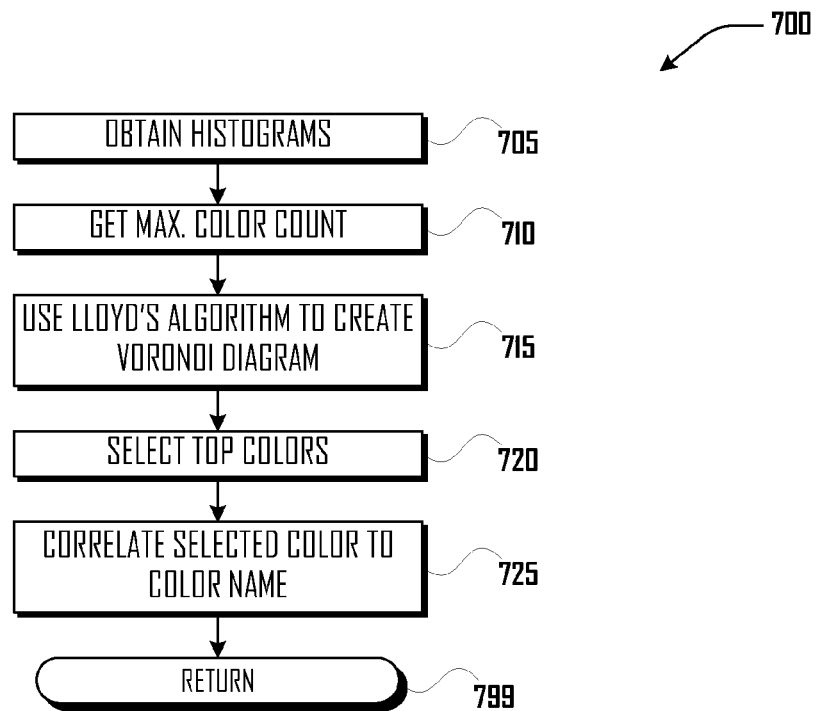
FIG. 7 is a flowchart illustrating a detail of a process illustrated in FIG. 3, in which the dominant color in a photograph is determined.

At step 700, the dominant colors in each Photograph are determined. An example of a process for determining the dominant colors in a Photograph is illustrated in FIG. 7. Turning to FIG. 7, color histograms for each Photograph are obtained at step 705. The color histograms may be of some portion of or all of the Photograph. The color histograms may be color histograms prepared, for example, at step 600. At step 710 a maximum color count may be obtained. The maximum color count may be a static number and may be a fixed part of the software routine which is performing this function, such as the Grouper-Selector. In this example, the maximum color count may be 10. At step 715, an implementation of Lloyd's algorithm on the RGB color cube for the Photograph is performed to create a Voronoi diagram. A Voronoi diagram is a way to divide a space into a number of regions. The Lloyd's algorithm in this example uses as its input the color histogram of step 705 and the maximum color count of step 710. The Lloyd's algorithm of this example partitions the input points, the pixel frequencies from the color histogram of step 705, into k initial sets, the maximum color count of step 710. The algorithm then calculates the average point, or centroid, of each set, such as according to average dimensions in Euclidean space, with the original location of each centroid generally starting at a random location. The algorithm constructs a new partition by associating each point with the closest centroid, such as using the Euclidean distance function. Then the centroids are recalculated for the new clusters and the algorithm iterates until convergence, a fixed number of iterations are performed, until points no longer switch clusters, or until centroids are no longer changed. The output of this step is an ordered, weighted, list, the weight of each determined by the number of pixels associated with each cluster.

At step 720 the dominant colors from the output of step 715 are selected, such as the top one color or the top one to three colors. At step 725, the selected top colors of step 720 may be correlated to color names. Returning to FIG. 3, at step 360, the output of step 700 (step 725, for example) may be saved, for example as Dominant Colors 1040.

At step 370, the dominant colors saved at step 360 may be obtained for all Photographs and, at step 375, the Photographs may be grouped by the dominant colors. Grouping by dominant color may be performed independently from grouping by similarity. At step 380, the color groups may be saved, for example, as part of Photo Groups 1010 (or in a separate grouping).

Figure 4:
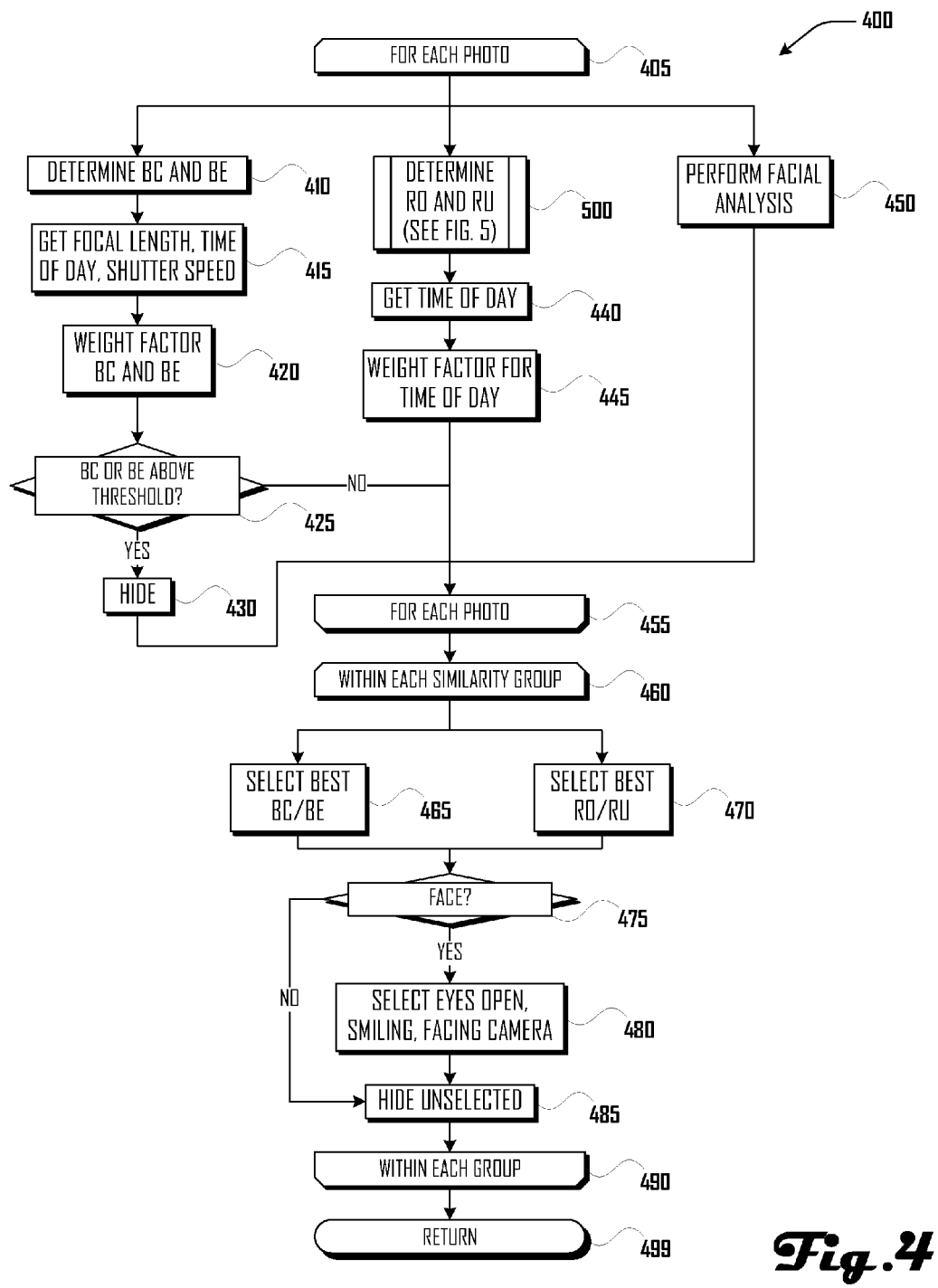
FIG. 4 is a flowchart illustrating a detail of a process illustrated in FIG. 2, in which the best pictures within each group are selected and in which the unselected photographs within each group are hidden.

As discussed above, FIG. 4 is a flowchart illustrating a detail of a process illustrated in FIG. 2, in which the best pictures within each group are selected and in which the unselected photographs within each group are hidden. The process illustrated in FIG. 4 may be performed, for example, by the Grouper-Selector routine. In FIG. 4, steps 405 through 455 are performed relative to each Photograph.

At step 410, the blur confidence, "BC," and/or blur extent, "BE," may be determined on, for example, a monochrome version of the Photographs. The BC generally is a ratio which measures whether the Photograph, overall, is blurry while the BE is a ratio which measures how much, if any, of the Photograph is blurry (BE looks at edge points in the Photograph and determines what the ratio of blurry edges to sharp edges is). There are numerous ways to derive BC and BE; an example is show in "Blur Detection for Digital Images Using Wavelet Transform," which article is submitted in an information disclosure statement associated with these papers. A summary of this example is that three iterations of the Haar wavelet transform are performed on the scalar lightness values of pixels in an image, such as from a monochrome version of a Photograph, to find pixels with high energy at three different scales and assign values thereto. These values are used to categorize pixels as edge-points or non-edge-points. Then a second set of tests is used to categorize edge points as being part of a blurry edge or a sharp edge. Ratios of various categories will determine the output values. The BC and/or BE values may be stored, for example, as BC-BE 1045 in the Datastore 1000.

At step 415, the value of adjustment factors, such as focal length, time of day, and shutter speed, are obtained, such as from the Photo Metadata (also illustrated in the Figures as Focal Length, Shutter Speed, and Time). The adjustment factors may influence the occurrence of blur in Photographs and may influence or relate to human tolerance of blur in a Photograph. At step 420, the adjustment factors may be used to weight-factor the BC and/or BE values. For example, a Photograph with a short focal length may be a macro-photograph of a flower. Many portions of the Photograph may be blurry, but a small portion, the stamens of the flower, for example, may be in focus. The Photograph may be aesthetically very pleasing. The short focal length may be converted into, for example, a numerical value less than one, which numerical value is then multiplied by the BC and/or BE value to decrease the result (or the adjustment factor may otherwise be implemented to compensate for greater blur tolerance due to focal length). Similarly, Photographs taken at night may have more blur because the aperture is wide and/or because the shutter speed is low; Photographs taken at night may be interesting or contain valuable information, notwithstanding that they are more blurry, resulting in greater tolerance for blur in night-time Photographs. Consequently, the Time may be converted into, for example, a numerical value less than one for times which are after sunset and before sunrise, which numerical value is multiplied by the BC and/or BE value to decrease the result (or the adjustment factor may otherwise be implemented to compensate for greater blur tolerance due to the time of day when the Photograph was taken). The adjustment factor for time of day may take into account the length of day in the locale where the Photograph was taken.

At step 425, a determination may be made regarding whether the adjusted BC and/or BE value(s) are above or below a threshold. If the value(s) are above the threshold, then at step 430, the Photograph may be hidden. Hiding a Photograph may be performed by setting a value in the Photo Metadata and or in the Photo Group, which value is recognized by, for example, the Photo Application, and which causes the Photograph to not be shown in an album or folder within the user interface of the Photo Application or which causes the Photograph not to be shown as part of the Photo Group when the Photo Group is rendered. Notwithstanding that the Photograph may be hidden, it may be visibly rendered in other views of the Photographs, such as in a view which shows all Photographs. If, at step 425, the value(s) are not above the threshold, then the Photograph may not be hidden.

Figure 5:
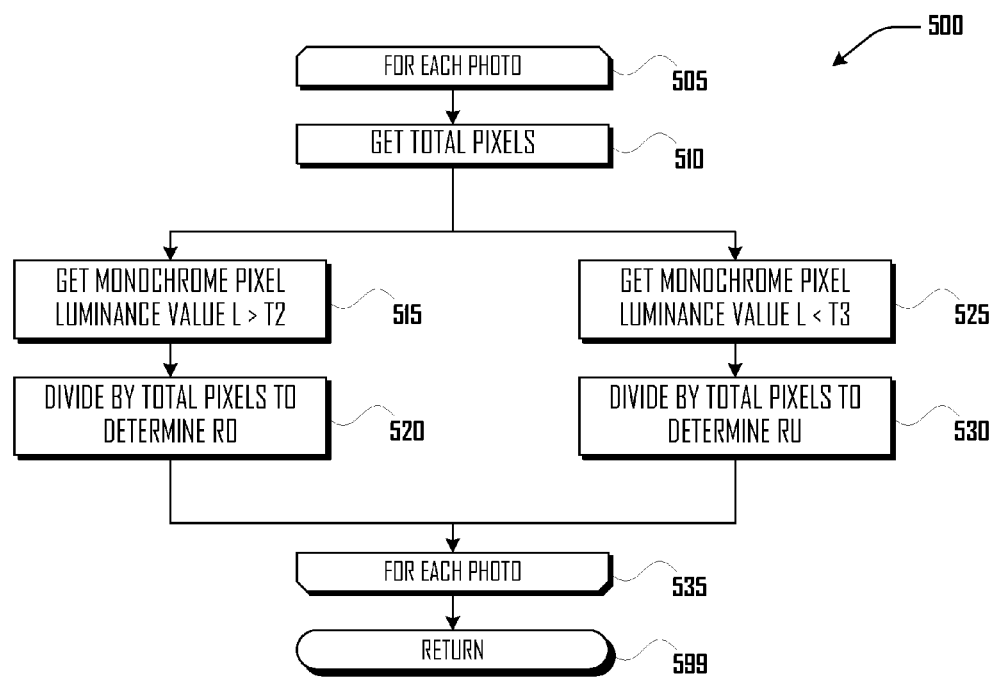
FIG. 5 is a flowchart illustrating a detail of a process illustrated in FIG. 4, in which photographs are evaluated for over- and under-exposure.

At step 500, rO and rU may be determined; rO generally being a factor describing whether a Photograph is over-exposed, rU generally being a factor describing whether a Photograph is underexposed. An example of a process for determining rO and rU is illustrated in FIG. 5. Turning to FIG. 5, at step 510, the total number of pixels in a Photograph may be obtained. At step 515, the number of monochrome pixels with a luminance value greater than a threshold, T2, is obtained. T2 is selected to be near the maximum luminance value of a pixel. At step 520, the number obtained at step 515 is divided by the number obtained at step 510, to produce rO. At step 525, the number of monochrome pixels with a luminance value less than a threshold, T3, is obtained. T3 is selected to be near the minimum luminance value of a pixel. At step 530, the number obtained at step 535 is divided by the number obtained at step 510, to produce rU.

Returning to FIG. 4, at step 440, the time when the Photograph was taken, such as Time 115, may be obtained. The time of day when the Photograph was taken may be an adjustment factor used relative to rO and rU. Similar to the adjustment factors utilized relative to BE and BC, humans may be more tolerant of underexposed Photographs taken at night and more tolerant of overexposed Photographs taken during the day. The time of day, perhaps corrected for the amount of daylight at the latitude where the Photograph was taken (if known), may be converted to a numerical value, which numerical value is multiplied by rO and/or rU to increase or decrease the value of rO and/or rU. At step 445, the rO and/or rU values may be adjusted by, for example, the adjustment factor(s) discussed immediately above.

At step 450, facial analysis may be performed on the Photograph. The facial analysis may return values indicating whether a face was detected in the Photograph, whether open or closed eyes are detected, whether the face is oriented toward the camera, whether glasses, facial hair, and similar, are detected in the Photograph. The facial analysis results may be stored, for example, in the Datastore 1000 as Face Data 1055.

Steps 460 to 490 are steps performed by the Grouper-Selector relative to all Photographs within the separate similarity groups, such as Photo Groups (the Photographs in a Photo Group have been determined, by the Grouper-Selector, to be of a similar subject). At step 465, the Grouper-Selector may select the Photograph which has the best BE and/or BC value (in this example, the Photograph with the lowest BE and/or BC value). At step 470, the Grouper-Selector may select the Photograph which has the best rO and/or rU value.

At step 475, a determination may be made based on the Face Data 1055 regarding whether there is a face, or not, in the Photographs in the Photo Group then being evaluated. If there was a face in the Photographs in the then-current Photo Group being evaluated, then at step 480 the Grouper-Selector may select the Photograph(s) (more than one Photograph may be selected) which have eyes open, a smile, and/or a subject which is facing the camera more directly.

At step 485, the Grouper-Selector may hide the unselected Photographs. As with step 430, hiding a Photograph may be performed by setting a value in the Photo Metadata and or in the Photo Group, which value is recognized by, for example, the Photo Application, and which causes the Photograph to not be shown in an album or folder within the user interface of the Photo Application or which causes the Photograph not to be shown as part of the Photo Group when the Photo Group is rendered. Notwithstanding that the Photograph may be hidden, it may be visibly rendered in other views of the Photographs, such as in a view which shows all Photographs.

FIG. 9 is a functional block diagram of an exemplary server computing device ("GS Server") and some data structures and/or components thereof. In some embodiments, the computing device 900 may include many more components than those shown in FIG. 9. However, it is not necessary that all of these generally conventional components be shown in order to disclose an illustrative embodiment. As shown in FIG. 9, the computing device 900 includes a network interface 905 for connecting to the Network 150.

The computing device 900 also includes at least one processing unit 945, memory 925, and an optional display 910, all interconnected along with the network interface 905 via a bus 920. The memory 925 generally comprises a random access memory ("RAM"), a read only memory ("ROM"), and a permanent mass storage device, such as a disk drive or SDRAM (synchronous dynamic random-access memory). The memory 925 stores program code for software routines, such as, for example, the Grouper-Selector routine 200, a webserver, browser as well as email servers, client applications, and database applications. In addition, the memory 925 also stores an operating system 930. These software components may be loaded from a non-transient computer readable storage medium 940 into memory 925 of the computing device 900 using a drive mechanism (not shown) associated with a non-transient computer readable storage medium 940, such as a floppy disc, tape, DVD/CD-ROM drive, memory card, or other like storage medium. In some embodiments, software components may also or instead be loaded via a mechanism other than a drive mechanism and computer readable storage medium 940 (e.g., via network interface 905).

The computing device 900 may also comprise hardware supporting optional input modalities, Optional Input 915, such as, for example, a touchscreen, a keyboard, a mouse, a trackball, a stylus, a microphone, and a camera.

Computing device 900 also comprises or communicates via bus 920 with data store 1000, illustrated further in FIG. 10. In various embodiments, bus 920 may comprise a storage area network ("SAN"), a high speed serial bus, and/or via other suitable communication technology. In some embodiments, computing device 900 may communicate with data store 1000 via network interface 905.

FIG. 10 is a functional block diagram of a datastore in the computing device of FIG. 9. This Figure illustrates data groups used by routines; these data groups are discussed above.

FIG. 11 is a functional block diagram of an exemplary client computing device ("Client Device") and some data structures and/or components thereof. The elements of FIG. 11 are generally the same as the similarly labeled elements in FIG. 9 (substituting "11" for "9" in the text, above). In addition, the Client Device illustrated in FIG. 11 comprises a Photo Application 1140, (the "Photo Application" routine having been discussed above).

Figure 13:
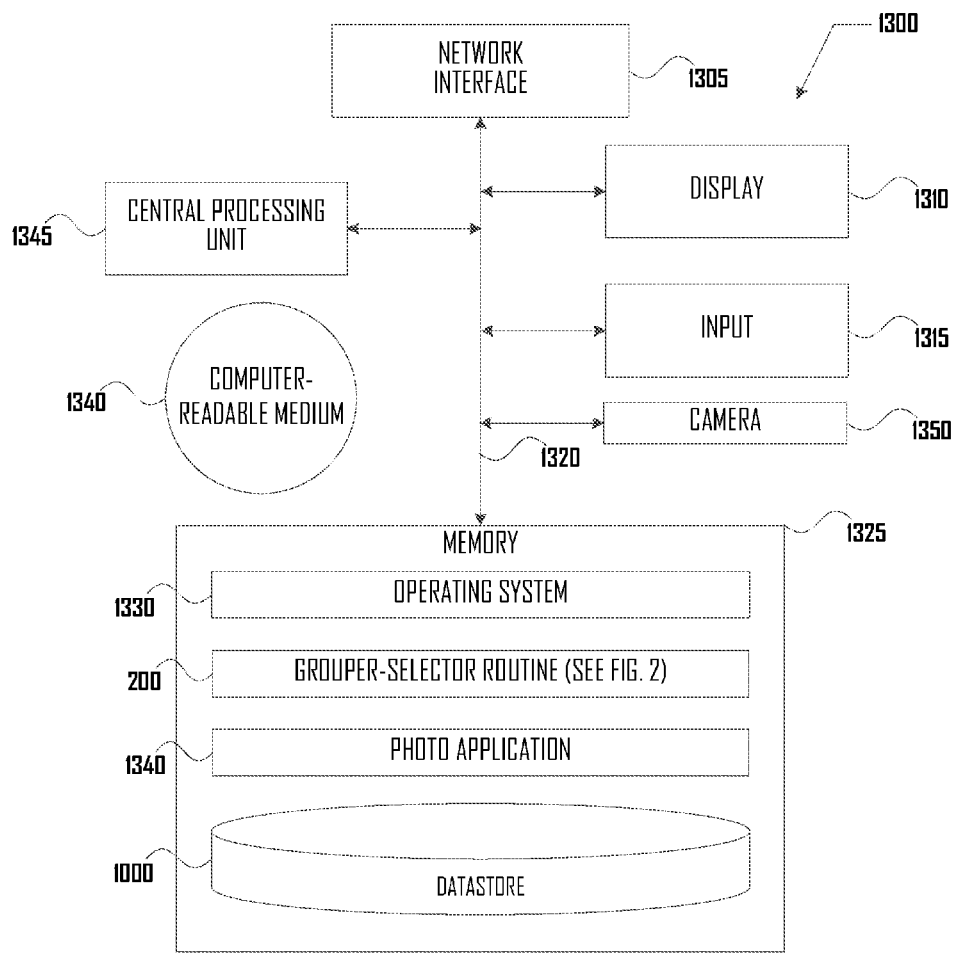
FIG. 13 is a functional block diagram of an exemplary mobile client computing device and some data structures and/or components thereof.

FIG. 12 is a functional block diagram of a datastore in the computing device of FIG. 11 and FIG. 13. This Figure illustrates data groups used by routines; these data groups are discussed above.

FIG. 13 is a functional block diagram of an exemplary mobile client computing device and some data structures and/or components thereof. The elements of FIG. 13 are generally the same as the similarly labeled elements in FIGS. 9 and 11 (substituting "13" for "9" and "11" in the text, above). In addition, the Mobile Client Device illustrated in FIG. 13 comprises a Camera 1350. While the GS Server is illustrated with Optional input 915, which may comprise a camera, the Mobile Client Device 1300 is illustrated with a Camera 1350, in addition to the Input 1315.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

The invention claimed is:

1. A method of grouping similar photographs and of selecting the best photographs within each group in a computer comprising a memory, the method comprising:
   for two or more photographs in the memory of the computer;
   determining that at least two of the two or more photographs are similar;
   within each set of photographs determined to be similar, identifying which of the photographs in the set meet a set of criteria; and
   hiding the photographs in each set which do not meet the criteria.

2. The method of claim 1, wherein determining that at least two of the two or more photographs are similar comprises obtaining at least one histogram of at least a portion of each of the photographs.

3. The method of claim 2, wherein the at least one histogram has a first axis representing wavelengths and a second axis representing the number of pixels in the photograph at the wavelengths.

4. The method of claim 2, further comprising finding a largest square within each of the photographs, dividing the largest square into four non-overlapping sub-squares, centering a fifth sub-square the size of one of the four sub-squares within the largest square, and wherein obtaining the at least one histogram comprises obtaining a separate histogram of each of the five sub-squares.

5. The method of claim 2, further comprising comparing the histograms of the photographs according to a distance function and determining that the at least two of the two or more photographs are similar when the output of the distance function is less than a threshold value.

6. The method of claim 5, wherein the distance function is applied separately for each of five sub-squares from corresponding portions of each photograph, wherein the output thereof is averaged, and wherein the average output of the distance function is less than a threshold value.

7. The method of claim 5, wherein the distance function is an earth mover's distance function.

8. The method of claim 5, wherein the threshold is 50.

9. The method of claim 1, further comprising determining a ranked weighted list of colors in each of the two or more photographs.

10. The method of claim 9, wherein determining a ranked weighted list of colors in each of the two or more photographs comprises obtaining a color histogram for each of the photographs and creating a voronoi diagram based on the color histograms and a color count.

11. The method of claim 9, further comprising selecting the top colors in the ranked weighted list of colors and grouping the photographs according to the top colors.

12. The method of claim 11, wherein the top colors are selected from at least one of the top color, the top two colors, and the top three colors.

13. The method of claim 1, wherein the two or more photographs are selected from a larger corpus of photographs, when the two or more photographs are associated with a date-time, and when the difference between the date-times for the two or more photographs is less than a threshold.

14. The method of claim 13 wherein the threshold is between five and fifteen minutes.

15. The method of claim 1, wherein identifying which of the photographs in the set meet the criteria comprises determining that at least one blur factor is below a threshold.

16. The method of claim 15, wherein the at least one blur factor comprises a blur confidence factor and a blue extent factor.

17. The method of claim 15, further comprising multiplying the at least one blur factor by a weight factor derived from at least one of a date-time, a shutter speed, and a focal length associated with the photograph.

18. The method of claim 1, wherein identifying which of the photographs in the set meet the criteria comprises determining a ratio, rO, of overexposed pixels to total pixels for each photograph and a ratio, rU, of underexposed pixels to total pixels for each photograph, and identifying the photograph with the lowest value for at least one of rO and rU as meeting the criteria.

19. The method of claim 18, wherein determining at least one of rO and rU further comprises multiplying the ratio by a weight factor derived from a date-time associated with the photograph.

20. The method of claim 1, wherein identifying which of the photographs in the set meet the criteria comprises receiving the result of facial analysis on the photographs, determining from the facial analysis that there is a human face in each photograph in the set, and identifying the photographs as meeting the criteria when facial analysis identifies that the human face has at least one of open eyes, a smile, and an aspect oriented toward the camera.

21. A computer system with a computer readable medium comprising instructions which, when executed, perform the method according to claim 1.

* * * * *